US010260588B2

United States Patent
Bournand

(10) Patent No.: US 10,260,588 B2
(45) Date of Patent: Apr. 16, 2019

(54) CABLE FRICTION DAMPER

(75) Inventor: Yves Bournand, Montigny le Bretonneux (FR)

(73) Assignee: VSL International AG, Köniz (CH)

( * ) Notice: Subject to any disclaimer, the term of this patent is extended or adjusted under 35 U.S.C. 154(b) by 1757 days.

(21) Appl. No.: 13/515,020

(22) PCT Filed: Dec. 23, 2009

(86) PCT No.: PCT/EP2009/067870

§ 371 (c)(1),
(2), (4) Date: Jun. 11, 2012

(87) PCT Pub. No.: WO2011/076277

PCT Pub. Date: Jun. 30, 2011

(65) Prior Publication Data

US 2012/0247036 A1    Oct. 4, 2012

(51) Int. Cl.
*F16F 7/08*    (2006.01)

(52) U.S. Cl.
CPC .................................. *F16F 7/082* (2013.01)

(58) Field of Classification Search
CPC ............. F16F 7/08; F16F 15/02; F16F 15/073
USPC ....... 52/167.1–167.6, 167.8, 167.9; 188/381; 14/22
See application file for complete search history.

(56) References Cited

U.S. PATENT DOCUMENTS

| | | | |
|---|---|---|---|
| 3,160,233 A * | 12/1964 | Norman | 188/268 |
| 3,349,418 A * | 10/1967 | Hein | 14/73.5 |
| 3,373,633 A * | 3/1968 | Desmond | F16F 15/165 188/266 |
| 3,866,724 A * | 2/1975 | Hollnagel | 188/129 |
| 3,979,110 A * | 9/1976 | Newton | 267/140 |
| 4,219,171 A * | 8/1980 | Rudmann | 244/172.4 |
| 4,261,441 A | 4/1981 | Wood | |
| 5,257,680 A * | 11/1993 | Corcoran et al. | 188/129 |
| 5,858,521 A * | 1/1999 | Okuda et al. | 428/219 |
| 6,443,437 B1* | 9/2002 | Beyene et al. | 267/64.26 |
| 2002/0074702 A1* | 6/2002 | Kogure et al. | 267/166 |
| 2002/0089105 A1* | 7/2002 | Fujita et al. | 267/140.14 |

(Continued)

FOREIGN PATENT DOCUMENTS

| | | |
|---|---|---|
| DE | 198 35 222 A1 | 2/1911 |
| DE | 19835222 | 2/1999 |
| EP | 1035350 A1 | 9/2000 |

(Continued)

OTHER PUBLICATIONS

International Search Report for PCT/EP2009/067870, dated Sep. 5, 2011.

(Continued)

*Primary Examiner* — Christopher P Schwartz
(74) *Attorney, Agent, or Firm* — Abel Schillinger, LLP

(57) ABSTRACT

A method and a device for damping relative motion between structural elements (4a, 4b, 5), and in particular for damping oscillations in a stay cable of a building or a civil engineering structure. A damping device is disclosed which provides motion damping by means of frictional engagement (1a, 1b) between friction surfaces composed of low-friction polymeric material (2a, 2b, 3a, 3b). The polymeric material preferably includes a dispersed lubricant. The use of low friction polymers results in a constant damping which is effective over a broad range of displacements and forces.

26 Claims, 2 Drawing Sheets

(56) References Cited

U.S. PATENT DOCUMENTS

Figure 1:
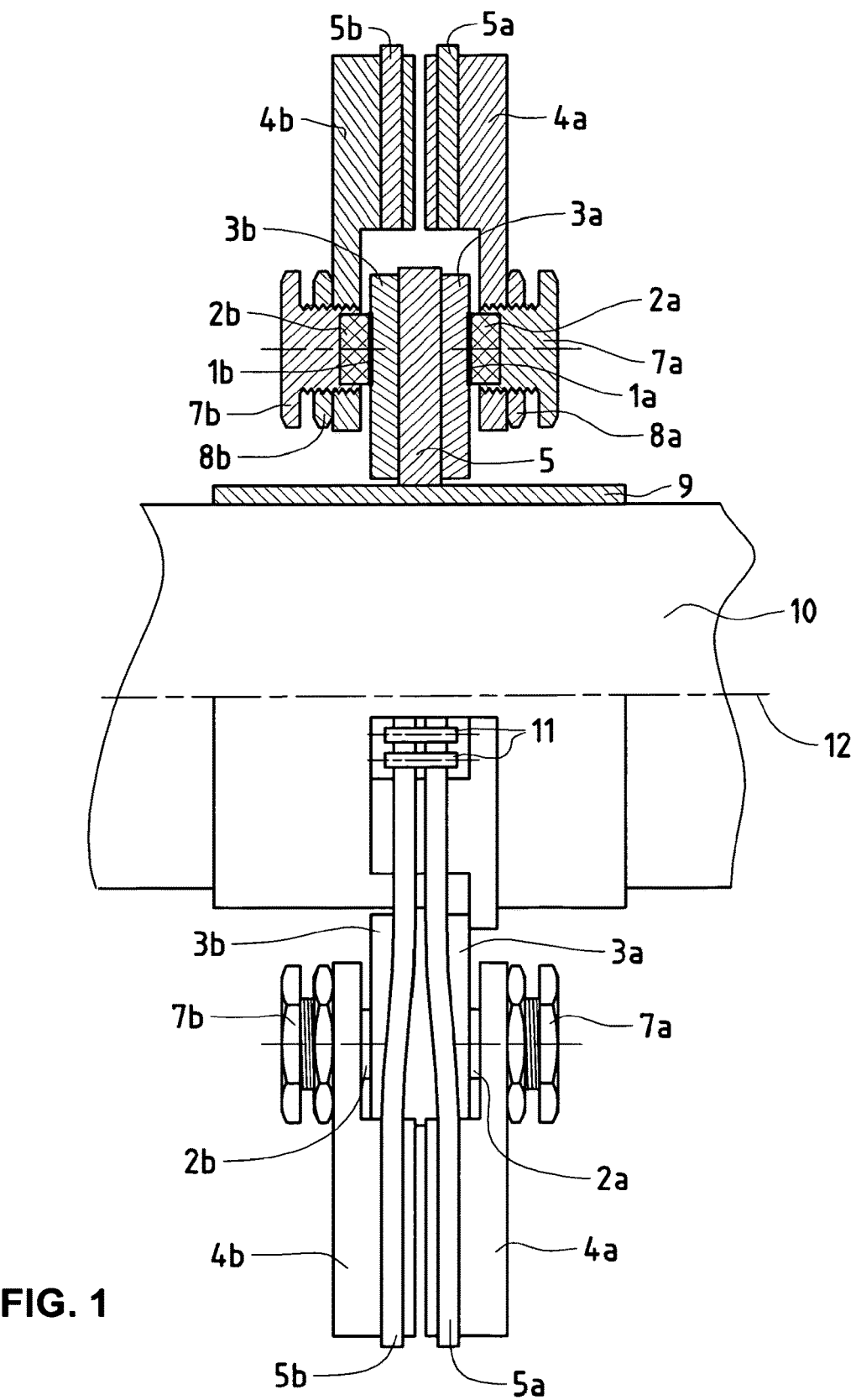

2009/0067767 A1* 3/2009 Faass .................... B64C 27/14
                                                              384/440
2009/0293380 A1* 12/2009 Sasaki et al. ................ 52/167.6

FOREIGN PATENT DOCUMENTS

| FR | 2888903 | | 1/2007 |
| FR | 2888903 | A1 | 1/2007 |
| WO | 9632868 | A1 | 10/1996 |

OTHER PUBLICATIONS

I. Kovacs, "zur Frage der Seilschwingungen under der Seildampfung," Die Bautecdhnik, Oct. 1982, pp. 3-10., with English synopss.

\* cited by examiner

CABLE FRICTION DAMPER

The invention relates to the technical field of damping relative movement between elements of a structure, and in particular to the damping of vibration in structural stay cables.

Cable-stayed bridges, suspension bridges and other cable-supported or reinforced constructions such as high steel towers, telecommunication masts and wind turbines require cables to ensure their structural strength and stability.

Such cables are often subjected to vibrations caused by wind and rain or induced by movements of the structure. It has been observed that these forces give rise to transverse oscillations and vibrations of the cables (see I. Kovacs, "Zur Frage der Seilschwingungen and der Seildämpfung", Die Bautechnik 10/1982, p. 3-10); over time, cables can be seriously damaged by such repetitive motion, especially in the region of the cables where they are secured to fixed anchorage points.

It has already been suggested to suppress such cable vibrations by providing cable vibration dampers. Several principles of damping have been used or proposed, such as neoprene, hydraulic dampers, damping by tuned mass systems and even eddy current brakes. However, all these devices are accompanied by serious drawbacks; the damping action of hydraulic dampers begins at very low values, near to zero, at the beginning of the vibration, and these forces are essentially proportional to the velocity of the point to be dampened. Such dampers are thus always in operation, and seals therefore become quickly damaged, leading to leakage which makes the dampers ineffective. A further disadvantage of viscous and hydraulic dampers is that they can be optimised for only one vibration mode. Tuned mass systems are too cumbersome, and technically difficult to realize, and they damp only one particular eigenfrequency. It has hitherto been considered disadvantageous to use these systems on the grounds that, since their damping action is effective even for very small relative oscillations of the cable, and since each movement causes wear, such systems suffer from high rates of wear and consequently require high maintenance. Some of these damping systems were also perceived to suffer from slippage and play, with the result that their damping function was unpredictable and inconsistent.

In order to overcome the perceived disadvantages of using dampers effective for small movements, it was proposed in European patent application EP1035350, filed by the present applicant, to use a damping device which was effective only for movements involving relatively large forces. This was achieved by using a friction damper having a significantly higher static coefficient of friction than its dynamic friction coefficient. In fact, although it was not mentioned in EP1035350, cast iron was used as an appropriate friction material, since it could be used to create a frictional engagement with a static coefficient at least 40% greater than its dynamic friction coefficient. This prior art friction damper deliberately makes use of friction materials which have high "stick-slip" properties. The term "stick-slip" refers to an effect which arises as a result of a significant difference between the static and dynamic friction coefficients of the frictional interface between the friction surfaces. A relatively large tangential force is required to initiate movement between the friction elements. However, once this large tangential force has been exceeded, and the friction elements begin to move relative to each other, the tangential force required to maintain the motion is significantly less. In this mode, the static friction coefficient acts as a barrier or filter which prevents motion due to tangential forces below a certain threshold. The dynamic coefficient of friction determines the tangential damping force which acts against the relative motion of the friction surfaces once they start to move, and thereby acts to damp the motion. The dynamic coefficient of friction of the friction materials used in the prior art dampers, such as cast iron, is typically in the region of 60% of their static coefficient of friction. Both of these coefficients can vary, however, depending on environmental factors such humidity, and mechanical factors such as the amount of wear or roughness on the friction surfaces. The prior art friction damper was thus designed to damp only the larger, higher energy oscillations. The cast-iron friction pads also suffer severely from age-related effects. The iron surface can become polished, for example, which impairs its damping performance. Or the friction can generate temperatures in the iron which are so high that there is a danger of the surfaces fusing together.

Note that the prior art damper disclosed in EP1035350 attempted to reduce this variation in the coefficients of friction by using springs to exert a relatively constant normal force between the two frictional surfaces. In this way, the influence of the thermal expansion or contraction on the normal force in the friction elements was virtually eliminated.

The prior art friction dampers suffers from the following disadvantages, however:

Firstly, the prior art dampers were designed to damp only movements with a force and magnitude greater than a certain threshold. In this way, it was hoped to reduce the number of relative movements between the friction surfaces, and thereby reduce the wear (and hence the maintenance costs) in the dampers. This solution was proposed in spite of the fact that it meant that the damper would not damp vibrations of smaller magnitude or lower energy. However, it is often desirable to damp as broad a range of vibrations as possible, including low-energy vibration, or movements of small force and magnitude, since even small vibrations can cause work-hardening and wear in the structure being damped. By damping small and low-energy vibrations, it is also possible to forestall their amplification into larger, more damaging vibrations, for example by cumulative resonance effects.

Secondly, even though they were designed to reduce the number of movements between the friction elements, the use of cast iron in the prior art friction dampers means that they still suffer from relatively rapid wear of the friction surfaces, and thus require regular inspection, adjustment and maintenance.

Thirdly, friction materials used in the prior art suffer from corrosion, especially where these dampers are used in exposed conditions such as stay cable bridges, where humidity and water ingress are difficult to prevent.

Fourthly, the stick-slip properties of the prior art dampers inevitably lead to sudden, discontinuous movements between the elements whose relative movement is being damped. A sudden jump occurs at the instant when the tangential force becomes great enough to overcome the damper's static friction coefficient. When this happens, the material of the structural elements being damped (usually steel) suffers a sudden and relatively large deformation. When this type of discontinuous deformation is repeated, it can lead to serious structural failure in the steel due to mechanical wear or work-hardening. Dampers are often positioned near the anchor points of stay cables, for example, to damp the lateral movement of the cable, and thereby reduce the amount of deformation of the cable where it enters the fixed anchor. The aim is to reduce the number and magnitude of deformations of the steel at the junction of the cable and the anchor, and thus reduce the risk of wear and structural impairment.

Fifthly, the braking friction of the prior art dampers (and therefore their damping function) can vary significantly when the friction surfaces are affected by humidity. Water presents a particular problem for such dampers; not merely because it can lead to corrosion on the friction surfaces, but also because any dampness on the friction surfaces can form an unpredictable lubricating effect on the friction surface which can significantly reduce the coefficients of friction of the damper.

Sixthly, the materials used in the prior art dampers can cause a significant level of noise when they are in operation. Each movement of steel cable against the iron friction pad(s) can give rise to the emission of unpleasant audible sounds and the transmission of high-frequency vibrations through the structure which may affect its long-term structural integrity.

The present invention aims to provide a low-maintenance damping method and device which solves some or all of the above problems. In particular, it aims to provide a damping function which has an improved breadth of frequency or oscillation-energy response, a more constant damping performance under varying environmental conditions, and an improved resistance to wear.

Note that the damping referred to in this application is described using the example of lateral oscillatory motion of cables relative to a fixed structure such as an anchor point. The previous patent application EP1035350 is used as an illustrative example of how and where the method and device of the present invention can be realised. However, it is anticipated that the damping of the present invention need not be limited to this configuration, and could be applied in any situation where damping is required, and in particular where the damping is required to have a broad frequency or oscillation-energy response and/or constant damping characteristics. Damping need not be just in one direction, but could be in multiple directions, in a single plane, for example, or in three dimensions. Damping devices may contain one, two or more sets of friction surfaces arranged in whatever spatial arrangement suits the particular application. While the damper of the present invention has been described in the context of damping oscillatory motions of structural elements, it can also be used to damp other kinds of relative motion.

It is an object of the present invention to provide a damper device for damping relative motion between a first structural member and a second structural member in a construction, the damper device comprising a first friction element mechanically associated with the first structural member, the first friction element including a first friction surface made of a first friction material, a second friction element mechanically associated with the second structural member, the second friction element including a second friction surface made of a second friction material, the first and second friction surfaces being in mutual frictional engagement such that relative motion between the first and second friction surfaces is damped by the frictional engagement between the first and second friction surfaces, the damper device being characterized in that at least one of the first and second friction materials is a low-friction polymer material.

In one embodiment of the invention, the low-friction polymer material used in the damper device of the invention comprises a distributed lubricant.

In another embodiment of the invention, the low-friction polymer material is polyethylene terephthalate.

In another embodiment of the invention, the static and dynamic friction coefficients of the frictional engagement between the first friction material of the first friction surface and the second friction material of the second friction surface are such that the static and dynamic coefficients differ by an amount which is less than 25% of the static friction coefficient.

In another embodiment of the invention, at least one of the first and second structural members is a cable under tension.

In another embodiment of the invention, a biasing means is provided for providing a biasing force which presses the first and the second friction surfaces against each other. According to a variant of this embodiment, the biasing means comprises at least one spring.

In another embodiment of the invention, a friction adjusting means is provided for adjusting the friction force of the frictional engagement between the first and second friction surfaces. According to a variant of this embodiment, the friction adjusting means comprises a biasing adjustment means for adjusting the biasing force.

In another embodiment of the invention, both the first and second friction materials are the low-friction polymer material.

In another embodiment of the invention, one of the first and second friction materials is the low-friction polymer material and the other is a metal.

It is also an object of the invention to provide a civil engineering structure comprising a first structural member and a second structural member, the civil engineering structure comprising one or more damping devices described above. In one embodiment of the civil engineering structure according to the invention, the first structural member is a structural cable, under tension, attached to an anchor point on the second structural member. In a variant of this embodiment, the damping device, or at least one of the damping devices, is arranged to damp oscillatory movements in the cable in a region of the cable adjacent to the anchor point.

It is a further object of the invention to provide a method of damping relative motion between a first structural member and a second structural member, the method comprising: a first step of providing the first structural member with a first friction surface comprising a first friction material, a second step of providing the second structural member with a second friction surface comprising a second friction material, a third step of applying a force to press the first and second friction surfaces together in mutual frictional engagement such that relative motion between the first and second friction surfaces is damped by the frictional engagement between the first and second friction surfaces, wherein at least one of the first and second friction materials is a low-friction polymeric material.

Figure 2:
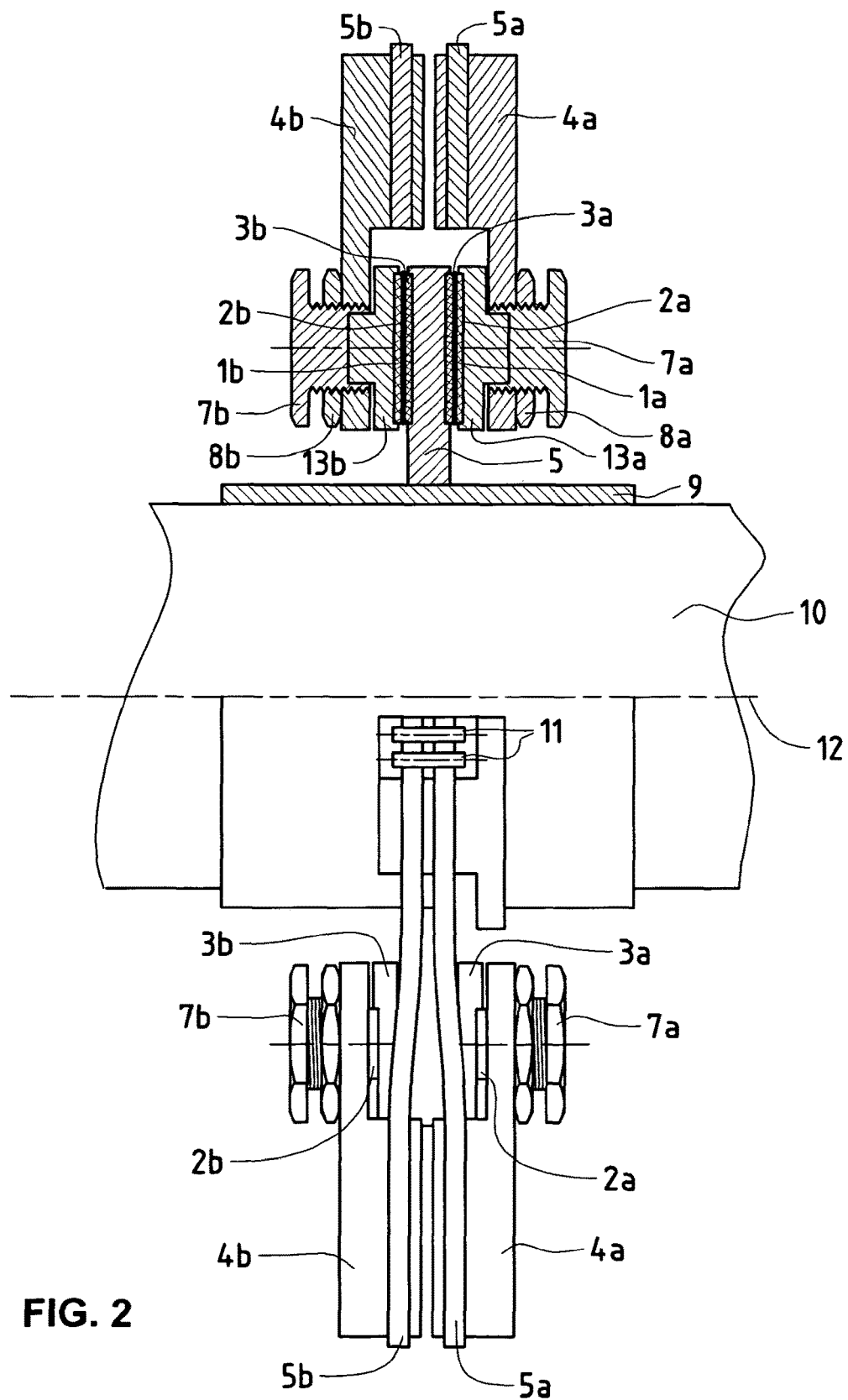

These and other advantages of the invention will be understood from the following description and drawings. The drawings comprise:

FIG. 1, which shows a partly sectioned elevation view of one example implementation of the invention for damping vibration in a cable, and FIG. 2, which shows a partly sectioned elevation view of a slightly different example of how the invention can be used for damping vibration in a cable.

An example application of the invention is shown in FIGS. 1 and 2. The top half of each figure is shown in sectional view, while the bottom half is shown in elevation. The following description refers to both FIG. 1 and FIG. 2 except where indicated. Note that the arrangements depicted in FIGS. 1 and 2 correspond to the figures of EP1035350, albeit with different reference numerals.

In both figures, a cable, 10, usually composed of multiple bundled cable strands, is shown with a longitudinal axis 12. A cable-damping system is shown which comprises essentially two sub-assemblies: a first sub-assembly which is mechanically secured to the cable, and a second sub-assembly which is mechanically secured to a reference point (not shown). The reference point is usually a fixed reference, such as a part of an anchorage of the cable, or a part of the structure to which the cable is anchored. It could, however, be a spring-and-mass assembly for, in conjunction with the damping device, providing a mass-damping system whose motion relative to the cable is itself damped.

The first damper sub-assembly, secured to the cable, comprises a collar 9 fastened around the cable 10, an orthogonal element 5 and two friction elements 3a and 3b mounted on the orthogonal element.

The second damper sub-assembly, secured to the reference, comprises two further friction elements 2a and 2b, mounted in threaded adjustable holders 7a and 7b which are in turn mounted in frames 4a and 4b. Frames 4a and 4b are secured to the ends to leaf springs 5a and 5b, and the other ends of leaf springs 5a and 5b are secured together and to the reference by fixings 11. The spring and frame arrangement is the same as disclosed in EP1035350, and is included to ensure a constant normal force urging the friction elements together.

1a and 1b show the region where the friction surfaces engage and cause the friction necessary for damping.

FIGS. 1 and 2 differ only in the configuration of the friction pads 2a, 2b, 2a and 3b. FIG. 1 shows an example arrangement in which one half (2a, 2b) of each friction pad pair is a block of friction material mounted in a threaded holder unit 7a, 7b. The threaded unit can be used to advance or retract the block towards or away from the other friction element 3a, 3b, which is a piece of low-friction polymer material bonded to the part 5, which is fixed relative to the cable.

FIG. 2 shows a similar arrangement, except that the friction surfaces are larger, and implemented as pairs of matching of friction pads 2a, 2b, 2a and 3b bonded to the surfaces of holder 13a, 13b or central part 5, as appropriate.

Note that, while both figures show two pairs of friction surfaces, and these surfaces can be made of the same low-friction polymer material, the frictional engagement 1a, 1b can be achieved using a different number of surfaces, using the same polymeric material for the friction pads, or using the polymeric material for one, or some of the frictions surfaces, and a different material, such as metal, for the other(s).

Some or all of the friction elements (2a, 2b, 2a and 3b) illustrated in FIGS. 1 and 2 are preferably composed of a low-friction polymer material such as polyethylene terephthalate (PET) containing dispersed lubricant. Such materials offer very low and very constant coefficients of friction, as well as a high resistance to wear and abrasion. They are highly resilient, and can bear high load forces, retaining their shape even under significant deformation or compression forces. One such material is marketed by the US company Quadrant under the name Ertalyte TX™. This kind of low-friction polymer is conventionally used in applications which require mechanical strength but low friction, such as bearings, bushings, glide rails, rollers and slide pads. Having very low friction coefficients, these materials are a counter-intuitive choice for a friction brake type damper. However, it has been found that, in spite of the very low friction coefficient of Ertalyte TX™, the springs 5a and 5b and the holders 7a and 7b can be designed so that sufficient normal force is exerted on the friction elements to provide the required amount of frictional engagement. The area of the engaging surfaces (1a, 1b) of the friction elements 2a, 2b, 3a and 3b can also be chosen to give the required friction engagement.

The use of such low-friction polymer materials has the additional advantage that their coefficients of friction do not change significantly with age; that their coefficients of friction do not vary in the presence of water or humidity; they are virtually silent in operation, and their frictional characteristics show greatly reduced stick-slip behaviour compared with the standard friction materials used in the prior art.

In the preferred arrangement, in which one or both of the friction surfaces in each pair is made from Ertalyte TX™, the resulting coefficient of friction is found to be typically in the region of 0.15 to 0.18. The static coefficient of friction is approximately 25% greater than the dynamic coefficient of friction. This compares with the prior art damper, with cast iron friction surfaces, which has a coefficient of friction of between 0.5 and 1.0, with a static coefficient which is 50% to 60% greater than its dynamic coefficient of friction.

The PET-with-lubricant material also presents a greatly reduced tendency to wear, and the wear occurs at a more or less constant rate. Experimental results showed a rate of wear of around 0.05 mm per 2000 oscillation cycles at the beginning of operation (during a so-called "running-in" or "bedding-in" period). After this initial period, however, the rate of wear is so small as to be negligible. By comparison, the rate of wear of the prior art cast-iron material during its running-in period may be of the order of 0.5 mm per 250 cycles.

The invention claimed is:

1. A damper device for damping relative motion between a first structural member and a second structural member in a construction, the damper device comprising
    a first friction element mechanically associated with the first structural member, the first friction element including a first friction surface made of a first friction material,
    a second friction element mechanically associated with the second structural member, the second friction element including a second friction surface made of a second friction material,
    the first and second friction surfaces being in mutual frictional engagement such that relative motion between the first and second friction surfaces is damped by the frictional engagement between the first and second friction surfaces,
    the damper device being characterized in that at least one of the first and second friction materials is a low-friction polymer material.

2. Civil engineering structure comprising a first structural member and a second structural member, the civil engineering structure being characterized in that it comprises one or more damper devices according to claim 1.

3. Civil engineering structure according to claim 2, in which the first structural member is a structural cable, under tension, attached to at least one anchor point on the second structural member.

4. Civil engineering structure according to claim 3, in which at least one of the damper devices is arranged to damp oscillatory movements in the cable adjacent to the at least one anchor point.

5. Civil engineering structure according to claim 3, wherein the first friction surface extends along a first plane and the second friction surface extends along a second plane that is parallel to the first plane, comprising a device that applies a constant force normal to the first plane and the second plane urging the first friction element against the second friction element, wherein the mutual frictional engagement occurs by a sliding of the first plane against the second plane under the constant normal force such that relative motion between the first and second friction surfaces is damped by the mutual frictional engagement.

6. Damper device according to claim 1, in which the static and dynamic friction coefficients of the frictional engagement between the first friction material of the first friction surface and the second friction material of the second friction surface differ by an amount which is less than 25% of the static friction coefficient.

7. Damper device according to claim 6, wherein a friction coefficient of the frictional engagement between the first friction material of the first friction surface and the second friction material of the second friction surface ranges from 0.15 to 0.18.

8. Civil engineering structure comprising the first structural member and the second structural member in which the first structural member is a structural cable, under tension, attached to at least one anchor point on the second structural member, wherein the civil engineering structure comprises at least one of the damper devices according to claim 7.

9. Damper device according to claim 1, comprising a biasing means for providing a biasing force which presses the first and the second friction surfaces against each other.

10. Damper device according to claim 9, comprising friction adjusting means for adjusting the friction coefficient of the frictional engagement between the first and second friction surfaces.

11. Damper device according to claim 10, in which the friction adjusting means comprises a biasing adjustment means for adjusting the biasing force.

12. Damper device according to claim 9, in which the biasing means comprises at least one spring.

13. Damper device according to claim 1, in which the low-friction polymer material comprises a distributed lubricant.

14. Damper device according to claim 1, in which the low-friction polymer material is polyethylene terephthalate.

15. Damper device according to claim 1, in which at least one of the first and second structural members is a cable under tension.

16. Damper device according to claim 1, in which both the first and second friction materials are the low-friction polymer material.

17. Damper device according to claim 1, in which one of the first and second friction materials is the low-friction polymer material and the other is a metal.

18. Damper device according to claim 1, wherein a friction coefficient of the frictional engagement between the first friction material of the first friction surface and the second friction material of the second friction surface ranges from 0.15 to 0.18.

19. Damper device according to claim 1, in which the low-friction polymer material comprises polyethylene terephthalate containing dispersed lubricant.

20. A damper device for damping relative motion between a first structural member and a second structural member in a construction, the damper device comprising:

a first friction element mechanically associated with the first structural member, the first friction element including a first friction surface made of a first friction material;

a second friction element mechanically associated with the second structural member, the second friction element including a second friction surface made of a second friction material;

the first and second friction surfaces being in mutual frictional engagement such that relative motion between the first and second friction surfaces is damped by the frictional engagement between the first and second friction surfaces;

wherein at least one of the first and second friction materials includes a low-friction polymer material;

a spring that provides a constant normal biasing force which presses the first and the second friction surfaces against each other.

21. Civil engineering structure comprising the first structural member and the second structural member in which the first structural member is a structural cable, under tension, attached to at least one anchor point on the second structural member, wherein the civil engineering structure comprises at least one of the damper devices according to claim 20.

22. Civil engineering structure of claim 21 wherein the static and dynamic friction coefficients of the frictional engagement between the first friction material of the first friction surface and the second friction material of the second friction surface differ by an amount which is less than 25% of the static friction coefficient.

23. Civil engineering structure of claim 22 wherein the other of the first and second friction materials includes metal.

24. Method of damping relative motion between a first structural member and a second structural member, the method comprising the steps of:

a first step of providing the first structural member with a first friction surface comprising a first friction material, a second step of providing the second structural member with a second friction surface comprising a second friction material, a third step of applying a force to press the first and second friction surfaces together in mutual frictional engagement such that relative motion between the first and second friction surfaces is damped by the frictional engagement between the first and second friction surfaces, the method being characterized in that at least one of the first and second friction materials is a low-friction polymeric material.

25. Method of claim 24 wherein a friction coefficient of the frictional engagement between the first friction material of the first friction surface and the second friction material of the second friction surface ranges from 0.15 to 0.18.

26. Method of claim 25 wherein the static and dynamic friction coefficients of the frictional engagement between the first friction material of the first friction surface and the second friction material of the second friction surface differ by an amount which is less than 25% of the static friction coefficient.

* * * * *